United States Patent [19]
Yannuzzi, Jr.

[11] Patent Number: 5,786,010
[45] Date of Patent: Jul. 28, 1998

[54] BAG AND METHOD OF MAKING THE SAME

[75] Inventor: Gilbert N. Yannuzzi, Jr., Ames, Iowa

[73] Assignee: American Packaging Corporation, Philadelphia, Pa.

[21] Appl. No.: 278,919

[22] Filed: Jul. 22, 1994

[51] Int. Cl.[6] ............................ B65D 85/00
[52] U.S. Cl. .................. 426/107; 426/111; 426/113; 426/123; 426/234; 426/243; 53/451; 53/452; 53/469; 53/476; 383/109; 383/120
[58] Field of Search ................ 426/104, 111, 426/113, 118, 123, 234, 243; 383/109, 120, 121; 53/451, 452, 469, 476

[56] References Cited

U.S. PATENT DOCUMENTS

| | | | |
|---|---|---|---|
| 3,672,320 | 6/1972 | Kardon | 118/221 |
| 3,851,574 | 12/1974 | Katz | 426/107 |
| 3,973,045 | 8/1976 | Brandberg | 426/110 |
| 4,461,031 | 7/1984 | Blamer | 383/123 |
| 4,571,337 | 2/1986 | Cage | 426/107 |
| 4,691,374 | 9/1987 | Watkins | 383/104 |
| 4,859,521 | 8/1989 | Pike et al. | 428/195 |
| 4,890,439 | 1/1990 | Smart et al. | 426/107 |
| 4,892,744 | 1/1990 | Ylvisaker | 426/111 |
| 5,044,777 | 9/1991 | Watkins | 383/100 |
| 5,061,500 | 10/1991 | Mandenhall | 426/118 |
| 5,171,950 | 12/1992 | Brauner et al. | 426/107 |
| 5,189,272 | 2/1993 | McDonald et al. | 219/10.55 E |

Primary Examiner—Lien Tran
Attorney, Agent, or Firm—John F. A. Earley; John F. A. Earley, III; Harding, Earley, Follmer & Frailey

[57] ABSTRACT

A bag suitable for use in microwave cooking is constructed of an elongated tube of flexible material closed at one end by a cold seal closure and having a heat seal adhesive deposit applied to the other end thereof for use in closing the bag after filling thereof.

17 Claims, 8 Drawing Sheets

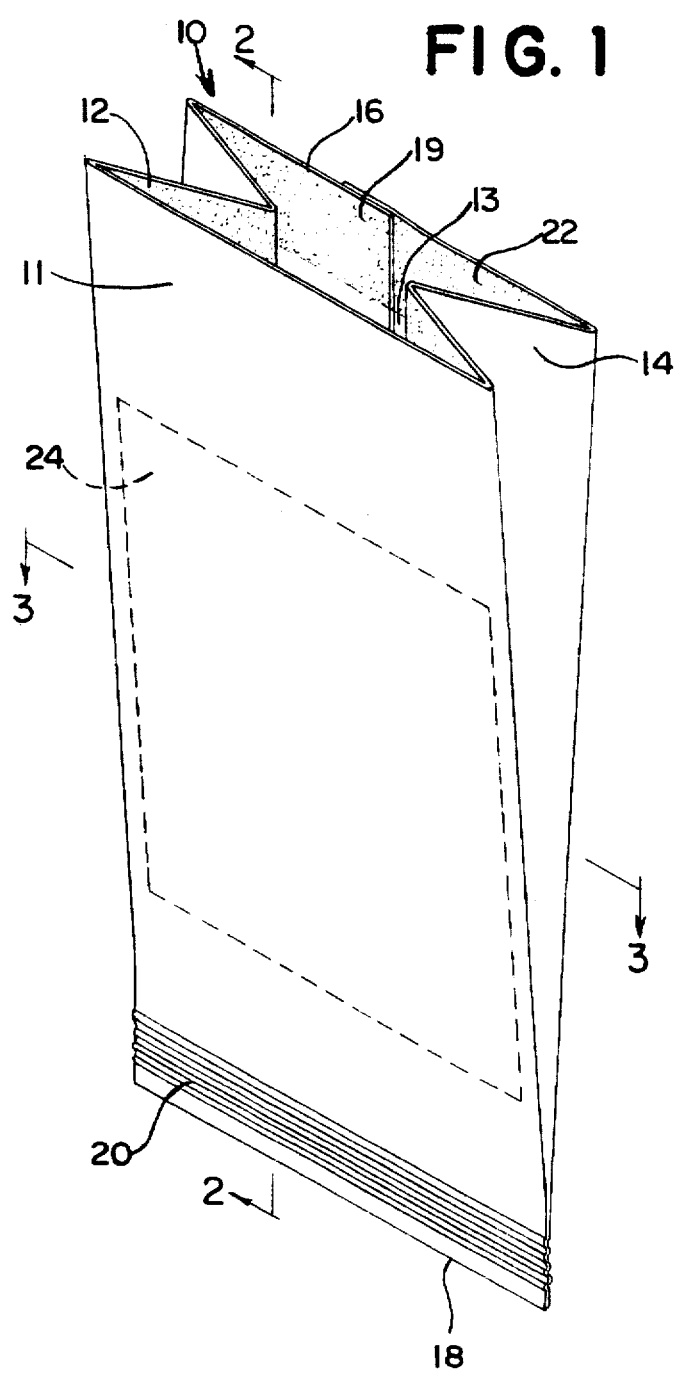
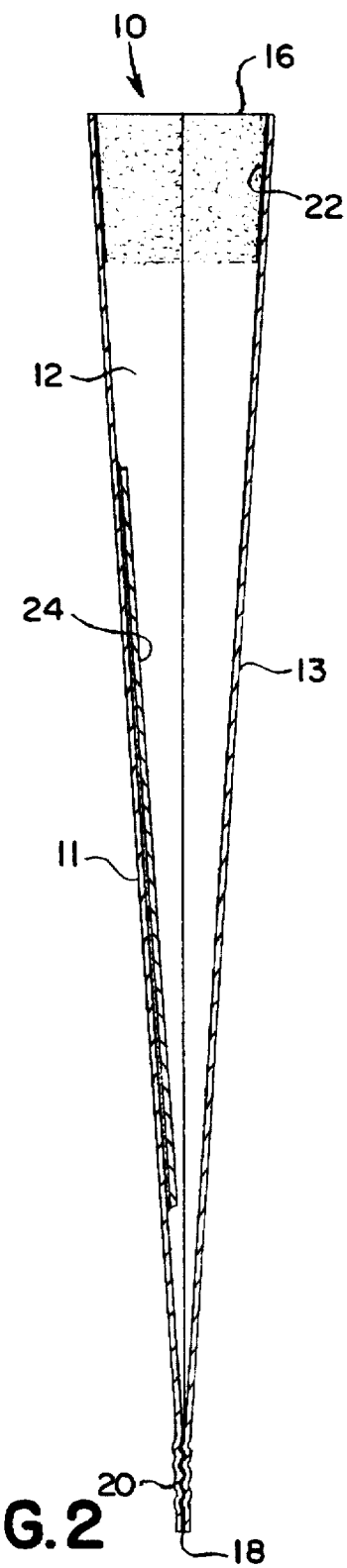
FIG. 1
FIG. 2

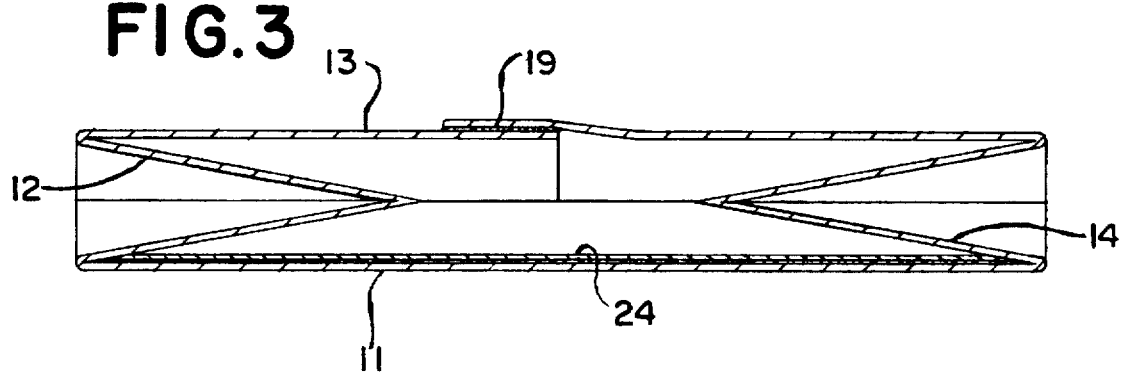
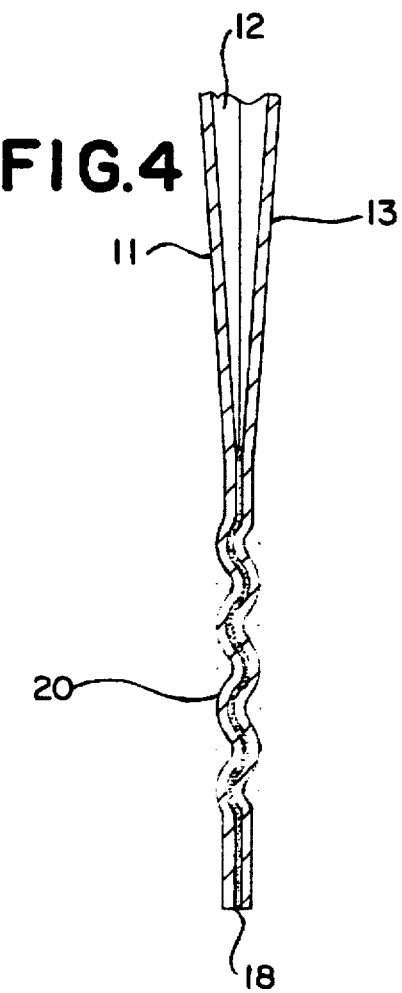

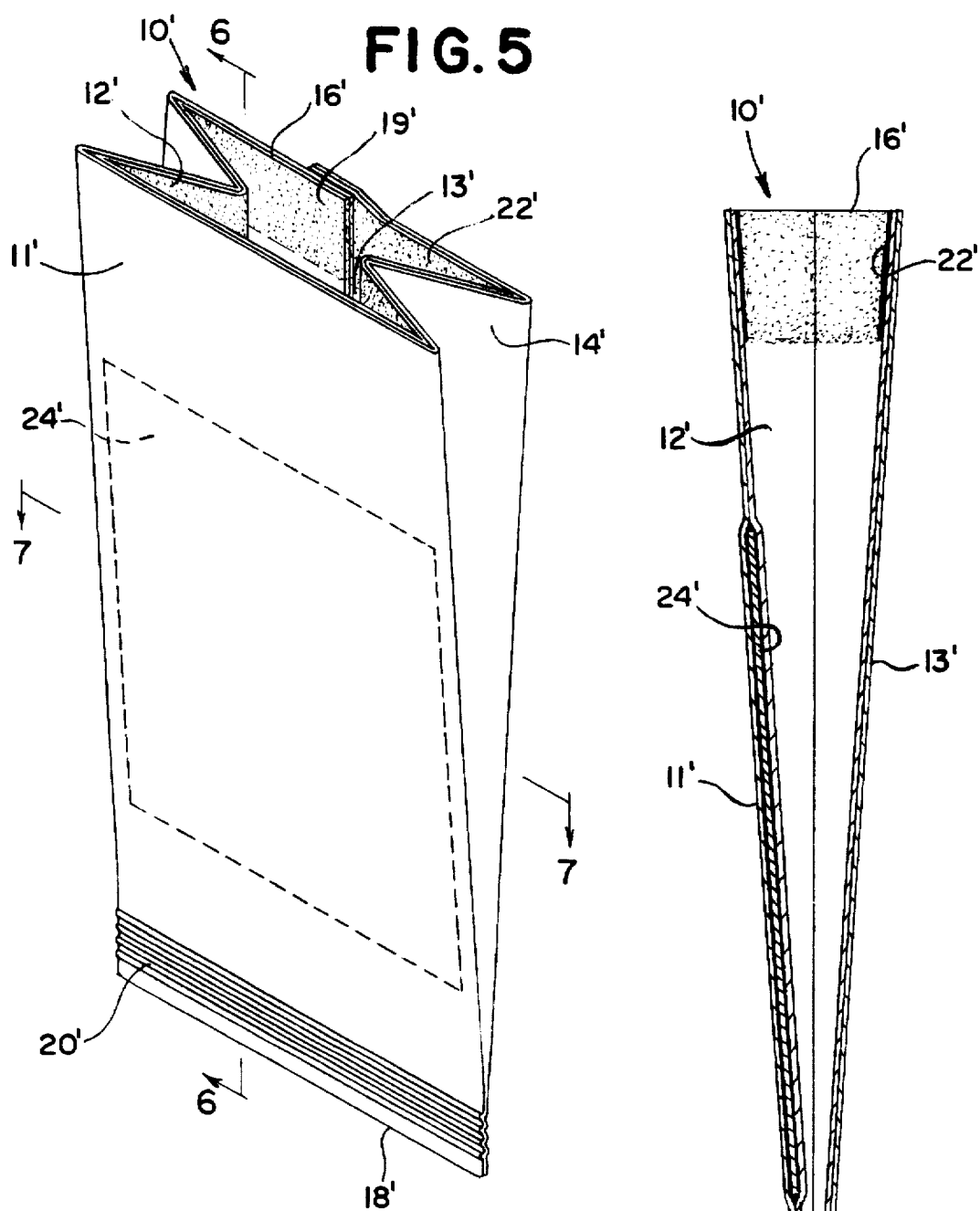

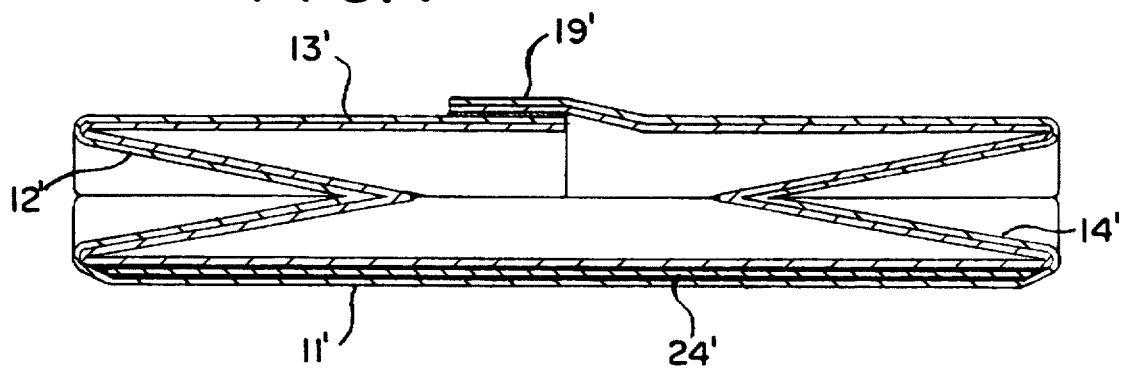
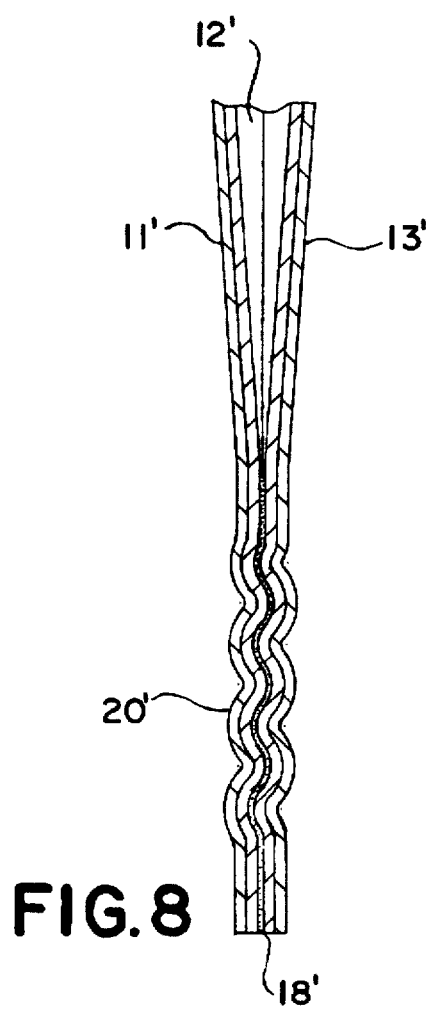

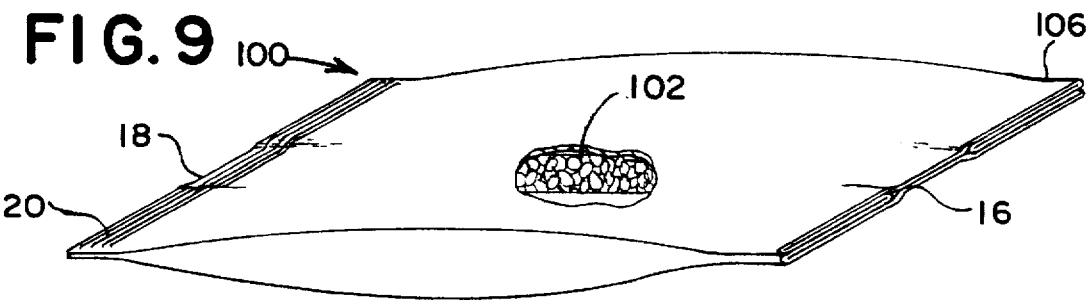
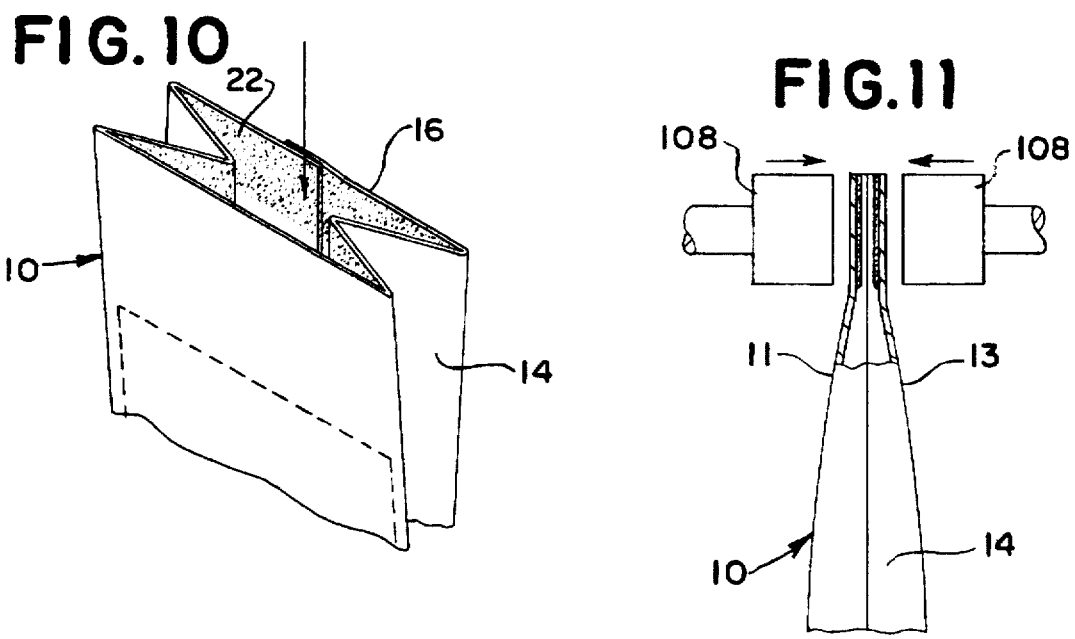
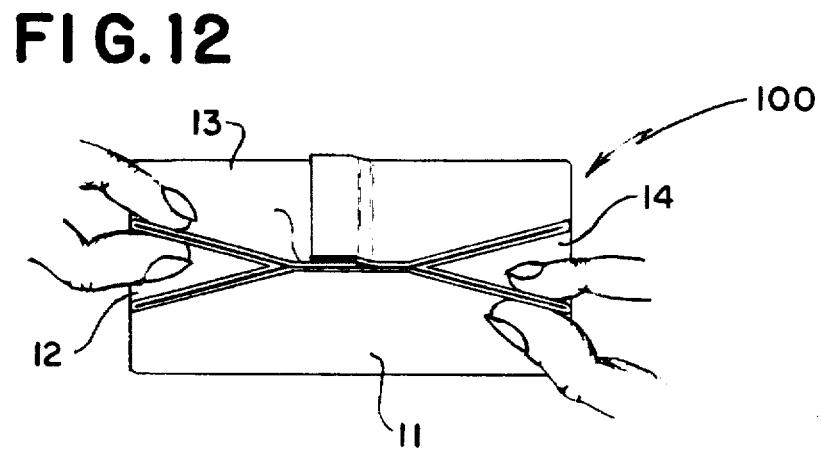

1

BAG AND METHOD OF MAKING THE SAME

BACKGROUND OF THE INVENTION

1. Field of the Invention

This invention relates to a bag of the type usable in microwave cooking of food products, such as popcorn. The invention also relates to a method of making a bag of the indicated type.

2. Description of the Prior Art

Microwave popcorn bags are well known. Illustrative of bags of this type are those disclosed in U.S. Pat. Nos. 3,691,374; 3,851,574; 3,973,045; 4,461,031; 4,571,337; 4,691,374; 4,892,744; and 5,044,777.

Although bags of the above-indicated type are generally satisfactory, there is need for improvement thereof in two areas, namely, in the cost of manufacture, and in the use of microwave packages made therefrom. Present day bags of the indicated type are formed into packages containing popcorn kernels, the packages being closed at upper and lower ends thereof by means of heat seals formed by the application of heat and pressure. The use of heat seals to close both ends of the bag is the source of two problems. The first problem is that it is difficult to provide a bag making process which can operate at a high speed because the formation of a heat seal closure requires a considerable dwell time, which extends the length of the production line. Another problem is that heat seal closures are difficult to open after the microwave cooking operation in order to gain access to the cooked product.

Attempts to provide an easily openable popcorn package are disclosed in U.S. Pat. No. 4,571,337, which illustrates in FIGS. 7 and 8 the manner in which the bag is opened by pulling on diagonally opposite corners at the upper end of a package after the microwave cooking operation is completed. The use of a heat seal closure as disclosed in U.S. Pat. No. 4,571,337, which is illustrative of the prior art, has proved to present problems in the easy opening of the bag. In many applications with the heat sealed closures of the prior art, the closure strength provided by the heat seal is greater than the tear strength of the paper forming the side panels of the bag thereby resulting in torn bags, spilled popcorn, and possible steam exposure to the consumer during the opening of the bag.

SUMMARY OF THE INVENTION

It is the general object of the present invention to provide a bag suitable for use in microwave cooking which comprises an elongated tube of flexible material sealed at one end by a cold seal closure and adapted to be sealed at its other end by a heat seal closure.

By reason of the construction in accordance with the invention wherein the bag is made with a cold seal at one end, it is possible to provide a high speed, compact bag making process which does not require the formation of a heat seal during the making of the bag.

In accordance with another feature of the invention, the cold seal closure can be designed to respond to the microwave cooking operation so as to provide a peelable closure which can be opened without tearing the side panels of the bag structure. Moreover, the openability of the cold seal closure is maintained for a longer time period after a cooking operation since it functions at lower temperatures than a comparable heat seal closure.

BRIEF DESCRIPTION OF THE DRAWINGS

FIG. 1 is a perspective view of a microwave popcorn bag pursuant to a first embodiment of the invention.

2

FIG. 2 is a sectional view taken on line 2—2 of FIG. 1.

FIG. 3 is a sectional view taken on line 3—3 of FIG. 1.

FIG. 4 is a detail view showing the cold seal of the bag shown in FIG. 1.

FIG. 5 is a perspective view of a microwave popcorn bag pursuant to a second embodiment of the invention.

FIG. 6 is a sectional view taken on line 6—6 of FIG. 5.

FIG. 7 is a sectional view taken on line 7—7 of FIG. 5.

FIG. 8 is a detail view showing the cold seal of the bag shown in FIG. 5.

FIG. 9 is a perspective view showing a package in accordance with the invention.

FIG. 10 is a view showing a first step in the procedure for providing a package made of the bag in accordance with the invention.

FIG. 11 is a view showing a second step in the method of making the package in accordance with the invention illustrating the step of heat sealing the top of the bag to close the same.

FIG. 12 is a view illustrating the procedure used to manually open the heat sealed end of the package after a microwave cooking operation in order to gain access to the contents of the package.

Figure 13:
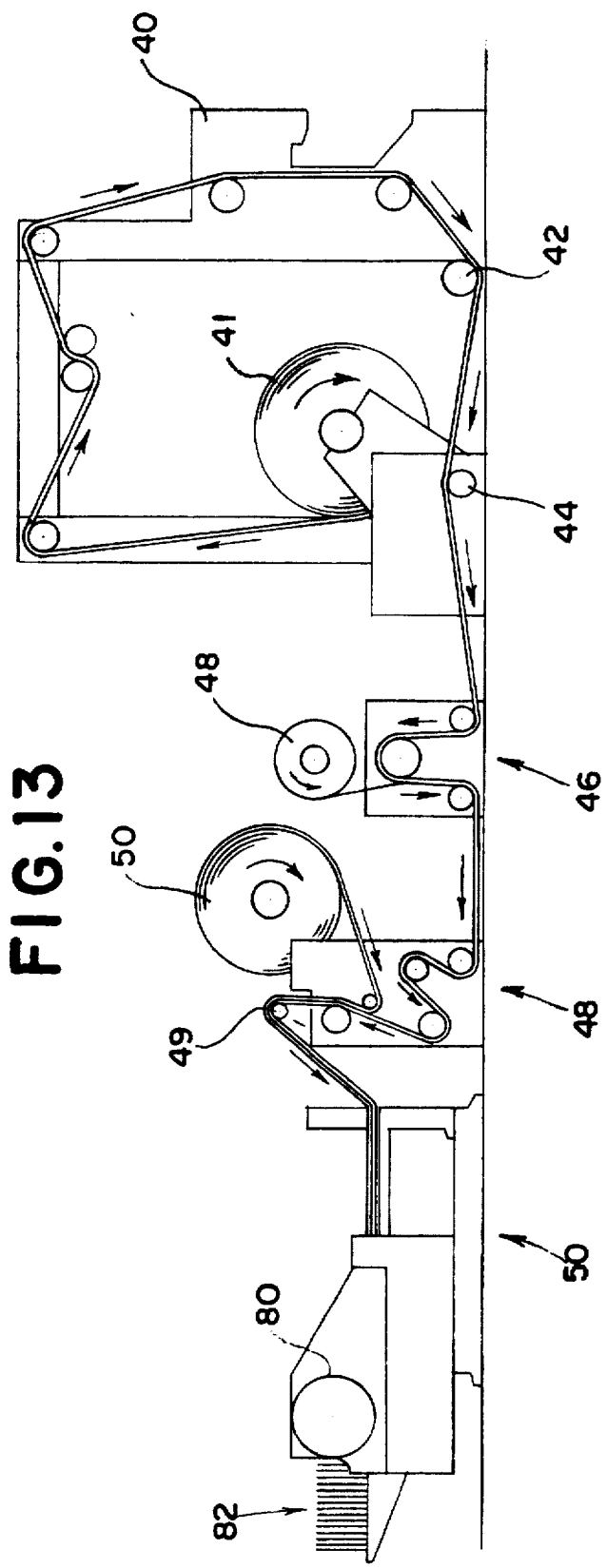

FIG. 13 is a side elevation, partly in diagrammatic form, showing a manufacturing process line for making a bag in accordance with the invention.

Figure 14:
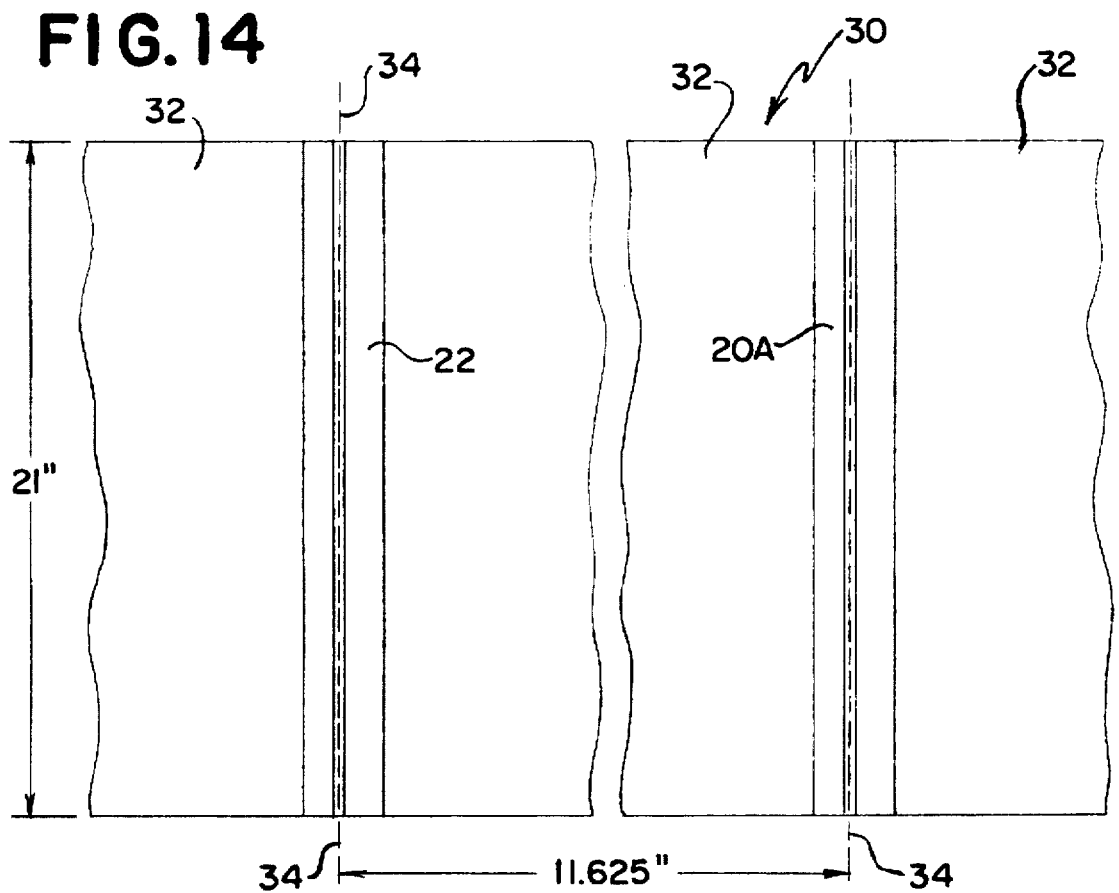

FIG. 14 is a plan view of a part of a web for use in forming the bag in accordance with the invention.

Figure 15:
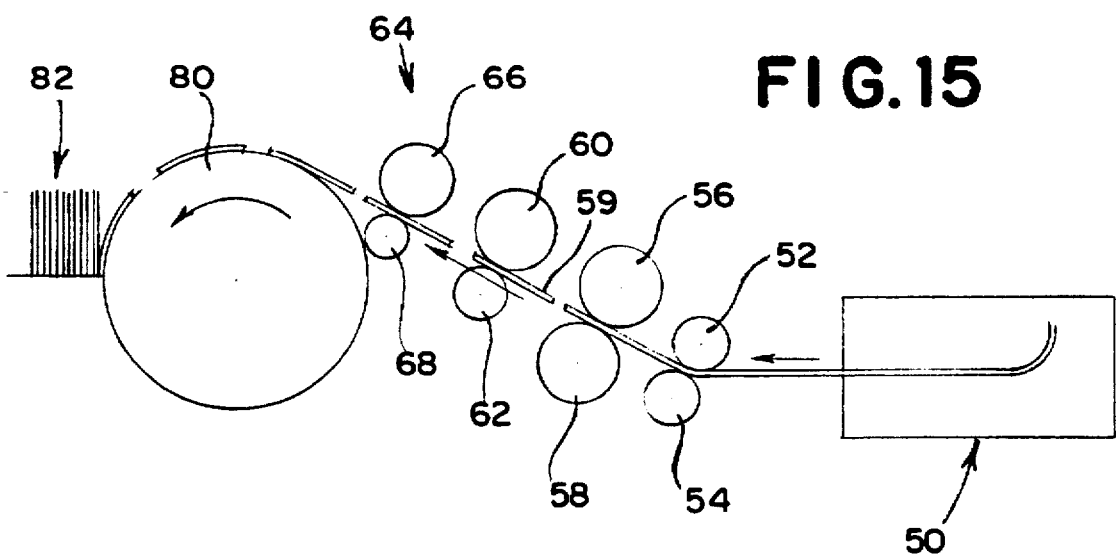

FIG. 15 is a detail view showing part of one work station of the process line shown in FIG. 13.

Figure 16:
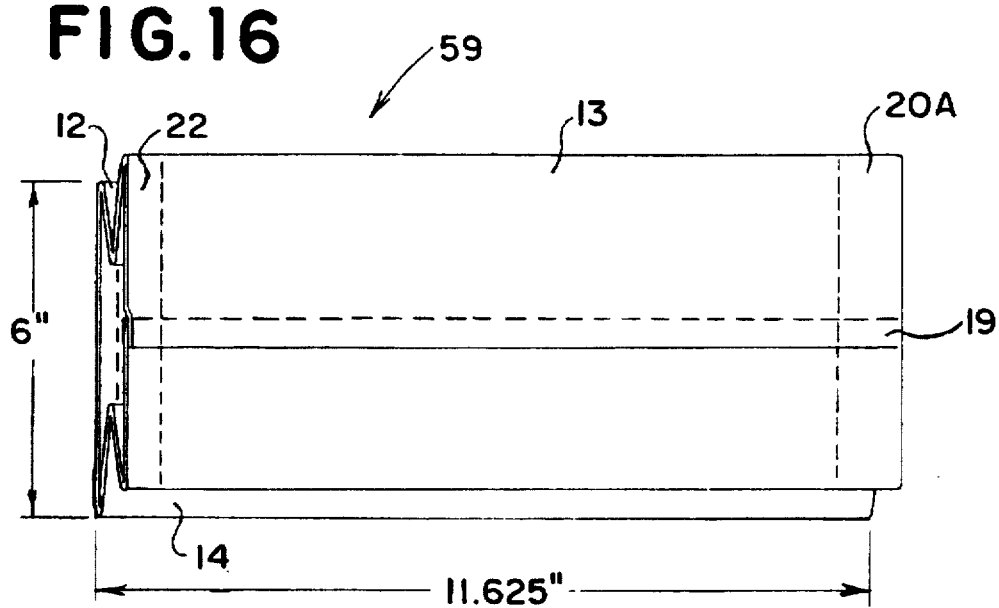

FIG. 16 is a view showing a tube formed during the process of making a bag in accordance with the invention.

Figure 17:
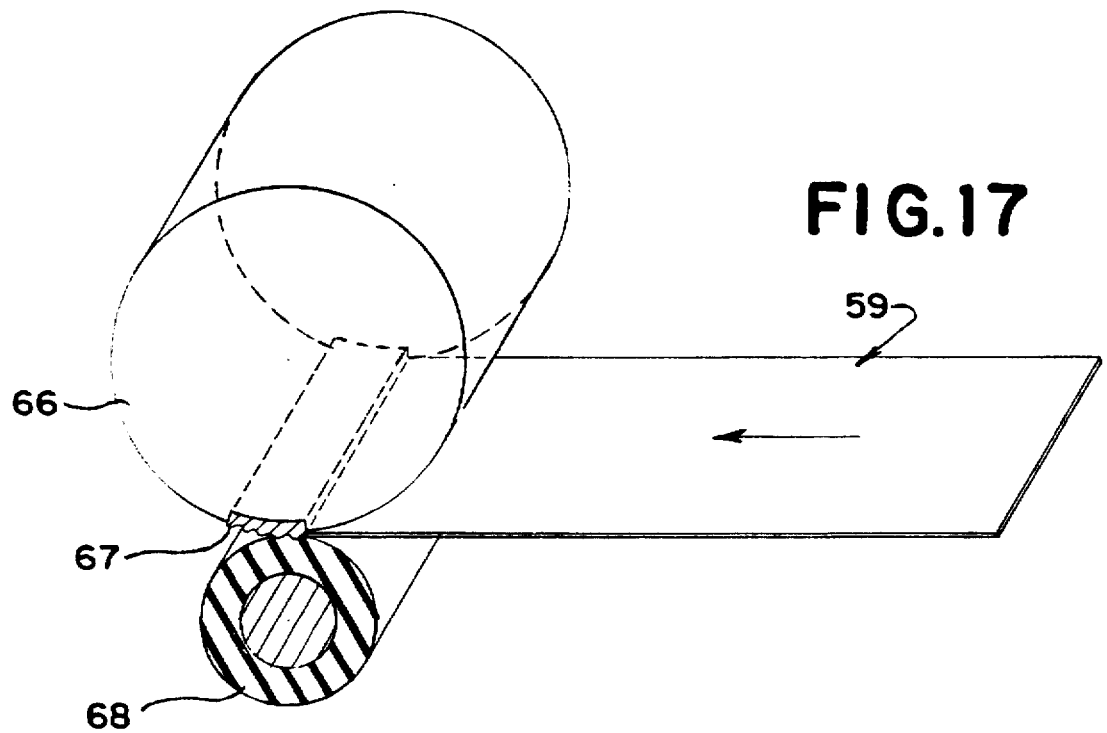

FIG. 17 is a detail view of the mechanism for forming the cold seal at one end of the bag in accordance with the invention.

DETAILED DESCRIPTION OF THE PREFERRED EMBODIMENTS

In FIGS. 1 to 4, there is shown a bag 10 in accordance with the invention suitable for use as a microwave popcorn bag. Bag 10 has a conventional pinch bottom bag construction comprising a tubular construction including a pair of opposed rectangular side panels 11 and 13 joined by a pair of opposed inwardly-folded gusseted side panels 12 and 14, all of which extend between and define an open end 16 and a sealed closed end 18 of the tubular construction shown. Bag 10 is made of a single-ply of flexible material, such as, for example, a grease-resistant paper of approximately 25-35 pounds per ream of a type well known in the art.

The tube forming the bag 10 is sealed along a longitudinal seam 19 by means of an aqueous adhesive as is conventional in the art.

The closed end 18 is sealed by a cold seal closure 20 in accordance with the invention. The term "cold seal" (also referred to in the art as a "cohesive seal") is used in the art, and hereinafter, to define a seal or bond formed by an adhesive which exhibits an affinity for itself, whereby when two separate surfaces having said adhesive thereon are brought together under pressure, they exhibit a strong tendency to stick to each other. The "cold seal" or "cohesive seal" in accordance with the invention is formed by an adhesive which provides a "fiber tearing" or "destruct" bond on the paper material, without the aid of heat or dwell time (as is required in a typical heat seal), when brought together under pressure only. The adhesive deposited to produce the cold seal closure 20 is a cohesive with good adhesion to paper substrates and having heat resistance in a microwave application, an example of which is a cold seal cohesive available from VALLEY ADHESIVES and COATING CORPORATION of Appleton, Wis. and sold under the tradename "Instabond" and designated as product C-2179-A. More specifically, this cohesive is a natural latex cohesive having a density of approximately 8.3 lbs/gal.

By way of example, the cold seal adhesive is applied in a pattern comprising a three-quarter inch wide band extending around the inner surface of panels 11–14 at the end 18 of the bag 10 shown in FIG. 1 at a dry coating weight of two to four pounds per ream, with bag 10 being 6.0 inches wide and 11.625 inches long.

The cold seal closure 20 is constructed and arranged to provide a bond which at ambient temperature cannot be opened without tearing the paper material, but which at an elevated temperature, such as that produced on the closure 20 by a microwave cooking operation, will be softened to form a "peelable" closure that can be opened easily without tearing the paper material by the manual application of a separating force which pulls side panels 11–14 apart. The term "peelable" as used in the art, and herein, is defined as the property whereby two plies of adhered material can be separated with failure occurring in the adhesive and not in the surface of the plies. Thus, cold seal closure 20 is made to withstand the rigors of microwave cooking and provide the "easy open" operation described above.

At the open end 16 of bag 10, there is provided a deposit of a heat seal adhesive 22 for use in closing this end of the bag 10 after the bag 10 is filled with popcorn kernels, and oil usually, by the packager. The heat seal adhesive 22 is applied in a pattern comprising a band extending around the inner surface of the panels 11 to 14. In the example of a 6×11.625 inch bag described above, the band of heat seal adhesive 22 has a width of approximately 1.375 inches. The application and arrangement of heat seal adhesive 22 is pursuant to present day practice. In accordance with the invention, the deposit of heat seal adhesive 22 is adapted to form a heat seal closure that forms a bond that is stronger (i.e., can better withstand the force therein caused by expanded gases produced within the bag 20 during cooking) than the bond formed by cold seal closure 20 at the elevated temperatures produced by a microwave cooking operation for which bag 10 is made. Moreover, the cold seal closure in accordance with the invention is particularly suited to being constructed and arranged to provide controlled venting whereby the package is vented at the end having the cold seal closure at a desired stage of the microwave cooking. This obviates a problem with the prior art packages having heat seal closures at both ends wherein the desired venting fails to occur thereby resulting in a poorly cooked product.

Side panel 11 is provided with a susceptor 24 formed of a paper/metalized polyester film laminate. It will be apparent that a wide variety of metals and polyester films can be used to produce susceptor 24. Susceptors are well known in the art and, generally, the preferred polyester film is PET (polyethylene terephthalate) and the metal is preferably aluminum. Susceptor 24 is a rectangular patch attached to the material forming bag 10 during the bag making process. Instead of providing a patch, it is also known in the art to print a susceptor material on the paper layer or on another laminating material.

The microwave popcorn bag 10 shown in FIGS. 1 and 2 is very economical to manufacture and can be formed into a popcorn package which is very easy and effective to use. Thus, bag 10 is closed at its one end 18 by the cold seal closure 20 described above and is open at its other end 16 which is used for filling the enclosed space within bag 10 located between the side panels 11–14. After filling the bag 10 with the desired amount of popcorn kernels, the end 16 is sealed in a conventional heat sealing procedure by applying heat and pressure to this end of the bag 10 to provide a heat sealed closure along the band of adhesive 22 as is conventional in the art. It is also common practice to tack the gusseted panels 12 and 14 together at end 16 by the use of heat seal adhesive applied to the opposing exterior surfaces thereof as is conventional in the art.

The bag 10 is also easy to use because the cold seal closure 20 is designed to form a peelable closure that, upon the application thereto of heat from a microwave cooking operation, can be opened easily without tearing by the manual application of a separating force which pulls the side panels 11–14 apart. This opening procedure is conventional in the art and is disclosed in the above-discussed patents. However, the novel cold seal closure 20 in accordance with the invention provides better results and permits the use of lighter weight microwavable bag structures, such as the single ply material for bag 10.

In FIGS. 5 to 8, there is shown a microwave popcorn bag 10' which is essentially the same as the bag 10 shown in FIGS. 1 to 4, wherefore, corresponding parts are given the same reference numerals with primes added.

Bag 10' is the same size as bag 10 and also suitable for use as a microwave popcorn bag. Bag 10' has a conventional pinch bottom bag construction comprising a tubular construction including a pair of opposed rectangular side panels 11' and 13' joined by a pair of opposed inwardly-folded gusseted side panels 12' and 14', all of which extend between and define an open end 16' and a sealed closed end 18' of the tubular construction shown. Bag 10' is made of a two-ply flexible material, such as, for example, an inner ply of grease-proof paper of approximately 20–25 pounds per ream and outer ply of bleached or natural kraft paper of approximately 20–25 pounds per ream, said two-ply material being well known in the art.

The tube forming the bag 10' is sealed along a longitudinal seam 19' by means of an aqueous adhesive seal as is conventional in the art. The closed end 18' is sealed by a cold seal closure 20' such as cold seal 20 described above except that cold seal 20' is applied to the inner surface of the inner ply of the two-ply material used to make bag 10'.

At the open end 16' of bag 10', there is provided a deposit of a heat seal adhesive 22' for use in closing this end of the bag after the bag 10' is filled with popcorn kernels. The heat seal adhesive 22' is located at a band extending around the inner surface of the inner ply of the panels 11' to 14' and is the same as heat seal adhesive 22 described above.

Side panel 11' is provided with a susceptor 24' formed of a metalized polyester film as is conventional in the art. It will be apparent that a wide variety of metals and polyester films can be used to produce susceptor 24'. Susceptors are well known in the art and generally the preferred polyester film in PET (polyethylene terephthalate) and the metal is preferably aluminum. Susceptor 24' is a rectangular patch located on side panel 11' between the plies of the material forming bag 10' and is inserted in position during the bag making process as is conventional in the art.

The microwave popcorn bag 10' shown in FIGS. 5 to 8 is very economical to manufacture and can be formed into a popcorn package which is very easy and effective to use.

Thus, bag 10' is closed at its one end 18' by the cold seal closure 20' described above and is open at its other end 16' for use in filling the enclosed space within bag 10' located between the side panels 11'-14'. After filling the bag 10' with popcorn kernels and oil, the end 16' is sealed in a conventional heat sealing procedure by applying heat and pressure to this end of the bag 10' to provide a heat sealed closure as is conventional in the art.

The bag 10' is also easy to use because the cold seal closure 20' is designed to form a peelable closure that, upon the application thereto of heat from a microwave cooking operation, can be opened easily without tearing by the manual application of a separating force which pulls the side panels 11'-14' apart as is conventional in the art and as is disclosed in the above-discussed patents.

FIG. 9 shows a microwave popcorn package 100 manufactured from a bag 10 in accordance with the invention. The bags 10 are shipped to a packager who completes the making of the package. Package 100 contains a quantity of unpopped kernels of corn 102 and has the end 16 of bag 10 sealed by a conventional heat seal closure 106. The filling of the bag 10 with a quantity of corn kernels is done through the open end 16 as shown in FIG. 10 after which this end 16 is closed by conventional heat sealing procedure illustrated in FIG. 11. As shown in FIG. 11, a pair of sealing jaws 108, at least one of which is heated, are pressed together across the upper ends of side panels 11 and 13 in the area of the heat seal adhesive deposit 22. As the jaws 108 are pressed together for a set dwell time under conditions of heat and pressure, a desired heat seal closure 106 is formed at the end 16 of bag 10.

FIG. 12 illustrates the procedure for opening a package 100 after the completion of a microwave cooking operation. It will be apparent that during the microwave cooking operation, the contents of the package 100, as well as the sealed closures 20 and 106, are heated, and the increased pressure of the gases within the package 100 cause it to expand a certain amount due to the generation of water vapor from the popping corn kernels. This applies pressure to the sealed closures 20 and 106, which, if desired can be designed to provide for venting as is well known in the art. The cold seal closure 20 is particularly suitable for the design of controlled venting as desired.

After the microwave cooking operation is completed, the popped corn is removed from the package 100 by manually opening the end 18 of the bag as illustrated in FIG. 12. The consumer is instructed on the package 100 to open the bag 10 carefully by pulling on top diagonal corners while avoiding contact with escaping steam. As discussed above, the novel cold seal closure 20 in accordance with the invention is constructed and arranged to provide a peelable closure when the bag 10 has its temperature elevated as a result of the microwave cooking operation for which it is made. What occurs is that the cold seal closure 20 becomes softened when exposed to the heat produced to thereby form a peelable closure that can be opened easily, without tearing the paper material providing the side panels 11-14, by the manual application of a separating force (as illustrated in FIG. 12) which pulls side panels 11-14 apart. It will be noted that the heat seal closure 106 is constructed and arranged so that it requires a higher separating force to open the same than the force required to open the cold seal closure 20 during and on completion of the microwave cooking operation. Moreover, as discussed above, the cold seal closure 20 can readily provide controlled venting and obviate the problems of non-venting that can occur in packages with heat seal closures at both ends.

The method of making a bag in accordance with the invention is shown in FIGS. 13 to 17. An initial step in the method is to provide a web 30 of flexible material for use in forming a tube, said web of material having a plurality of successive web lengths 32 of equal size such as that shown in FIG. 14 wherein part of a flat web 30 is illustrated. Each web length 32 has a first deposit 20A of a cold seal adhesive suitable for forming the cold seal closure 20 at its one end and a second deposit 22 of a heat seal adhesive suitable for forming the heat seal closure 106 of package 100 (as described above) at its other end. Deposits 20A and 22 extend transversely across each web length 32 at the ends thereof as shown in FIG. 14. Each web length 32 extends between the two transversely extending cut-off lines indicated at 34 in FIG. 14 and located adjacent to and outwardly of adhesive deposits 20A and 22. In order to make a bag 10 of the 6.0×11.625 inch size described above, each web length 32 is 21.0 inches wide and 11.625 inches long.

After web 30 has adhesive deposits 20A and 22 applied thereto (which is typically done by a printing operation), it is wound into a large coil and delivered to the bag making machine. In the case of bag 10, the adhesive deposits are applied to a web used to provide the single ply of material from which bag 10 is made. In the case of bag 10', the adhesive deposits are applied to a web used to provide the inner ply of the two-ply material from which bag 10' is made.

In FIG. 13, there is shown a production line for making a pinch bottom bag such as the bag 10' shown in FIGS. 5 to 8. In FIG. 13, arrows are used to show the direction of movement of the webs through the bag making machine shown therein. At its input end at the right end of FIG. 13, there is provided a flexographic printing press 40 which has the outer ply of the two-ply bag material fed therethrough from a coil 41 thereof (as shown by the arrows in FIG. 13) so that the desired ink printing is applied on the side of the outer ply which will be formed into the outer surface of the bag 10'. This printing press arrangement is conventional in the art.

The outer ply is fed from the press 40 across idler rollers 42 and 44 to a work station 46 whereat the susceptor patch is applied to the inner surface outer ply from a coil 48' thereof by a construction that is conventional in the art. The outer ply with the susceptor patch applied thereto is then passed through a work station 48 whereat the liner, or inner ply of the two-ply bag material, is laminated onto the inner side of the outer ply by an arrangement conventional in the art. Also at work station 48, the seam adhesive for forming the longitudinal seam 19 is applied by a glue applicating roller indicated at 49. The liner is supplied from a pre-printed coil 50' which has the cold seal adhesive deposit 20A and heat seal adhesive deposit 22 pre-applied thereto in the arrangement of web lengths 32 as shown in FIG. 14.

The two-ply web with the seam adhesive thereon and the susceptor patches located between the plies is then fed from the work station 48 to a tube forming machine 50. The tube forming machine 50 is conventional and is constructed and arranged for the forming of a tube from a flat web by means of a conventional former plate arrangement. Because of the tackiness of the cold seal adhesive deposit 20A, a "Teflon" former is used, which reduces friction between the adhesive and the former plate. The conventional forming machine 50 operates by forming a tube around former plates and then passing a formed tube-shaped web between a pair of cooperating draw rollers 52 and 54 (FIG. 15) to a pair of cut-off rollers 56 and 58 which cut this web along the transverse cut-off lines 34 to form tube lengths 59 as shown in FIG. 16.

From the cut-off rollers 56 and 58, a formed and cut-off tube length 59 is fed by a pair of transfer rolls 60 and 62 to a work station 64 shown in FIG. 17 whereat the cold seal closure 20 is formed. As shown in FIG. 15, the tube length 59 passes from the cut-off rollers 56 and 58 and is fed by a pair of transfer rollers 60 and 62 between a pair of rollers 66 and 68 which form the cold seal closure 20 at the end of the tube length 59 by an arrangement shown in detail in FIG. 17. To this end, the lower roller 68 is made of a high durometer rubber and the upper roller comprises a crimp block 67, which is a metal strip extending across the entire width of the tube length and mounted in a recess on the periphery of roller 66. Crimp block 67 has the desired crimp pattern, namely, a plurality of rib-like projections, formed in its outer surface facing lower roller 68. The position of the rollers 66 and 68 are controlled by an air regulated system to ensure that a consistent pressure (such as produced by a pressure setting of 50–90 PSI) is applied to the end of the tube length 59 passing therebetween so to pressurize the same in order to form the cold seal closure 20 in accordance with the invention.

The completed bag 10', which comprises a tube with the cold seal closure 20 formed at its one end, is then fed around a drum 80 and stored in a collector area 82 for pick-up.

The production line shown in FIG. 13 is essentially conventional except for the portion thereof whereat the formed tube 59 is fed to the cold sealing station 64. As is apparent from the consideration of the drawings, the production line is very compact and is arranged in a straight line whereby it can be constructed to operate at very high speeds. In prior comparable pinch bottom production lines, the length of the line required to produce the conventional heat seal closure at one end of the pinch bottom bag is much longer than that of the cold seal station 64 shown in FIG. 13 and requires a considerable dwell time to perform the heat seal closure step.

The method of making a bag 10 as shown in FIGS. 1 to 4 is essentially the same as that shown in FIGS. 13 to 17, the only difference being that a single ply of material is used and there is no need to combine two plies as described in the method described above. In this case, a coil of the single ply material is mounted in the press 40 at the same location as the coil 41 for the outer ply and a liner coil 50' is not necessary.

While the invention has been disclosed by reference to the details of preferred embodiments, this disclosure is intended in an illustrative rather than in a limiting sense, as it is contemplated that modifications will readily occur to those skilled in the art, within the spirit of the invention and the scope of the appended claims.

What is claimed is:

1. A bag suitable for use in microwave cooking comprising an elongated tube of flexible material having a plurality of side panels, a top first end located at one end of the said side panels, and a bottom second end located at the other end of said side panels, cold seal means for sealing said top first end of said tube including a bond of a cold seal adhesive means for bonding the too first end of the tube together such that the bond at ambient temperatures cannot be opened without tearing the flexible material of the tube and such that the bond at elevated temperatures produced in microwave cooking softens to form a peelable closure that may be opened without tearing the flexible material of the tube, said cold seal adhesive means located on opposed inner surfaces of said side panels, said cold seal adhesive means on said side panels being pressed together to form a cold seal closure extending across said top first end of said tube, and heat seal means for sealing said bottom second end of said tube including a deposit of a heat seal adhesive on opposed inner surfaces of said side panels, said heat seal adhesive being responsive to the application of heat and pressure thereto to form a heat seal closure extending across said bottom end of said tube.

2. A bag according to claim 1 wherein said peelable closure can be opened easily without tearing by the manual application of a separating force which pulls said side panels apart.

3. A bag according to claim 2 wherein said heat sealed closure requires a higher separating force to open the same than said force required to open said peelable cold seal closure.

4. A bag according to claim 2 wherein said cold seal adhesive is comprised of natural latex cohesive.

5. A bag according to claim 1 wherein said tube of flexible material is formed from a single ply construction and including a patch of susceptor material secured to one of said side panels.

6. A bag according to claim 1 wherein said tube of flexible material is formed from a two-ply construction and including a patch of susceptor material located on one of said side panels between said plies of said flexible material.

7. A package for use in microwave cooking comprising a bag including an elongated tube of flexible material having a plurality of side panels, a top first end located at one end of said side panels and a bottom second end located at the other end of said side panels, cold seal means for sealing said top first end of said tube including a bond of a cold seal adhesive means for bonding the top first end of the tube together such that the bond at ambient temperatures cannot be opened without tearing the flexible material of the tube and such that the bond at elevated temperatures produced in microwave cooking softens to form a peelable closure that may be opened without tearing the flexible material of the tube, said cold seal adhesive means located on opposed inner surfaces of said side panels, said cold seal adhesive means on said side panels being pressed together to form a cold seal closure extending across said top first end of said tube, and heat seal means for sealing said bottom second end of said tube including a bond of a heat seal adhesive on opposed inner surfaces of said side panels, said heat seal adhesive having been subjected to heat and pressure to form a heat seal closure extending across said bottom second end of said tube, said tube providing an enclosed space located between said first and second seals, and a quantity of microwavable product contained within said enclosed space.

8. A package according to claim 7 wherein said peelable closure can be opened easily without tearing by the manual application of a separating force which pulls said side panels apart.

9. A package according to claim 8 wherein said cold seal adhesive comprises natural latex cohesive.

10. A package according to claim 8 wherein said heat seal closure requires a higher separating force to open the same than said force required to open said peelable cold seal.

11. A package according to claim 7 wherein said tube is formed of a flexible material of a single-ply construction and including a patch of susceptor material secured to one of said side panels.

12. A package according to claim 7 wherein said tube of flexible material is formed from a two-ply construction and including a patch of susceptor material located on one of said side panels between said plies of said flexible material.

13. A high speed compact method of making a bag suitable for use in microwave cooking comprising providing a web of flexible material for use in forming a tube, said web of material having a plurality of successive lengths of equal size, each length of said web having a cold seal first deposit of a cold seal adhesive means at its one end for bonding a top first end of the tube together such that the bond at ambient temperatures cannot be opened without tearing the flexible material of the tube and such that the bond at elevated temperatures produced in microwave cooking softens to form a peelable closure that may be opened without tearing the flexible material of the tube, and a hot seal second deposit of heat seal adhesive at its other end, forming each length of said web into a tube having a plurality of opposed side panels, each of which has a portion of said cold seal first and heat seal second adhesive deposits at the ends thereof, applying pressure at high speed without applying heat and without requiring a dwell time to said opposed side panels of each tube at locations at said cold seal top first end thereof to form a cold seal closure extending thereacross whereby a tubular bag is provided, said bag being closed at one end by said cold seal closure and being opened at its other end whereat said heat seal deposit is located so that said bag can be filled therethrough.

14. The method according to claim 13 including the step of attaching a susceptor patch to one of said side panels.

15. The method according to claim 13 wherein said web is formed by a pair of plies fed together and including the step of positioning a susceptor patch between said plies so that it is located on one of said side panels.

16. The method according to claim 13 wherein said cold seal adhesive comprises natural latex cohesive.

17. A method of using the bag of claim 1, comprising filling the bag with kernels of corn through said heat seal open end, applying pressure and heat to said opposed side panels of each tube at locations of said heat seal bottom end thereof to form a heat seal closure extending thereacross, placing the filled bag in a microwave oven, heating the bag and its contents to pop the corn kernels and make the cold seal closure peelable, removing the bag from the microwave oven, and peeling open said cold seal closure to open the bag.

* * * * *